US009858568B2

(12) United States Patent
Moore et al.

(10) Patent No.: US 9,858,568 B2
(45) Date of Patent: Jan. 2, 2018

(54) TRANSACTION PROCESSING AND REMOTE ACTIVATION

(71) Applicant: M-KOPA IPR, LLC, Wilmington (DE)

(72) Inventors: Jesse Keith Barton Moore, Nairobi (KE); Nicholas Hughes, Alresford (GB)

(73) Assignee: M-Kopa IPR, LLC, Wilmington, DE (US)

( * ) Notice: Subject to any disclaimer, the term of this patent is extended or adjusted under 35 U.S.C. 154(b) by 0 days.

(21) Appl. No.: 14/331,165

(22) Filed: Jul. 14, 2014

(65) Prior Publication Data

US 2014/0324684 A1 Oct. 30, 2014

Related U.S. Application Data

(63) Continuation of application No. 13/699,297, filed as application No. PCT/IB2011/000998 on May 10, 2011.

(30) Foreign Application Priority Data

May 20, 2010 (GB) .................................. 1008368.1
May 27, 2010 (GB) .................................. 1008910.0

(51) Int. Cl.
*G06Q 20/00* (2012.01)
*G06Q 20/38* (2012.01)
(Continued)

(52) U.S. Cl.
CPC ......... *G06Q 20/38* (2013.01); *G06Q 20/3224* (2013.01); *G06Q 30/06* (2013.01);
(Continued)

(58) Field of Classification Search
CPC ......... H04W 4/00; G06Q 20/00; G06Q 20/08; G06Q 20/22; G06Q 20/30; G06Q 30/06;
(Continued)

(56) References Cited

U.S. PATENT DOCUMENTS

| 4,624,578 A | 11/1986 | Green |
| 4,700,296 A | 10/1987 | Palmer, Jr. et al. |

(Continued)

FOREIGN PATENT DOCUMENTS

| JP | 2004-220350 A | 8/2004 |
| KR | 10-2007-0055106 A | 5/2007 |

(Continued)

OTHER PUBLICATIONS

Hara, Y., "Sharp Sees Big Picture for Solar Outdoor Lighting," Electronic Engineering Times, Aug. 23, 2004, <http://www.eetimes.com/document.asp?doc_id=151024&> [retrieved Jun. 30, 2013], 2 pages.

(Continued)

*Primary Examiner* — Daniel Felten
(74) *Attorney, Agent, or Firm* — Seed IP Law Group LLP

(57) ABSTRACT

A device is communicatively connected to a remote transaction processing system. In at least one embodiment, the device comprises a dedicated power supply that is independent of a mains power supply, and has an operational state that is set according to an outcome of a transaction processed by the remote transaction processing system. The remote transaction processing system processes the transaction via communication with a separate mobile communications device. In another embodiment, a system comprises a device having a primary function other than facilitating communication, an interface for operating the device, and a transaction processing system that is remote from the device. The device, the interface, and the transaction processing system communicate wirelessly. The transaction processing system is configured to process payment transactions for usage of the device, and the outcome of the payment transactions determines whether the device is operational to provide its primary function.

30 Claims, 4 Drawing Sheets

(51) Int. Cl.
*G06Q 20/32* (2012.01)
*G06Q 30/06* (2012.01)
*G07F 15/00* (2006.01)
*G07F 15/12* (2006.01)
*G07F 17/00* (2006.01)
*H05B 37/02* (2006.01)
*H05B 37/00* (2006.01)

(52) U.S. Cl.
CPC .......... *G07F 15/003* (2013.01); *G07F 15/006* (2013.01); *G07F 15/12* (2013.01); *G07F 17/0014* (2013.01); *H05B 37/00* (2013.01); *H05B 37/02* (2013.01); *H05B 37/0272* (2013.01); *Y04S 50/10* (2013.01); *Y04S 50/12* (2013.01)

(58) Field of Classification Search
CPC .... G06Q 20/38; G06Q 20/3224; Y04S 50/10; Y04S 50/12; G07F 15/003; G07F 15/006; G07F 15/12; G07F 17/0014; H05B 37/00; H05B 37/02; H05B 37/0272; H05B 37/227; G06F 17/30879
USPC ................... 705/35, 37, 38, 40, 44
See application file for complete search history.

(56) References Cited

U.S. PATENT DOCUMENTS

| | | | |
|---|---|---|---|
| 5,046,093 A | | 9/1991 | Wachob |
| 5,221,838 A | * | 6/1993 | Gutman et al. ............... 235/379 |
| 5,367,330 A | | 11/1994 | Haave et al. |
| 5,506,572 A | | 4/1996 | Hills et al. |
| 5,555,551 A | * | 9/1996 | Rudokas et al. ............. 455/410 |
| 5,848,054 A | * | 12/1998 | Mosebrook ............. H04B 3/54 340/3.7 |
| 5,887,266 A | * | 3/1999 | Heinonen et al. ........... 455/558 |
| 5,943,423 A | * | 8/1999 | Muftic ............... 705/67 |
| 6,025,774 A | | 2/2000 | Forbes |
| 6,078,806 A | * | 6/2000 | Heinonen et al. ........... 455/406 |
| 6,195,648 B1 | | 2/2001 | Simon et al. |
| 6,249,217 B1 | | 6/2001 | Forbes |
| 6,349,314 B1 | * | 2/2002 | Patel |
| 6,535,726 B1 | | 3/2003 | Johnson |
| 7,362,213 B2 | | 4/2008 | Cohen |
| 7,677,753 B1 | | 3/2010 | Wills |
| 8,311,521 B1 | | 11/2012 | Paczkowski et al. |
| 2002/0123964 A1 | | 9/2002 | Kramer et al. |
| 2002/0128932 A1 | | 9/2002 | Yung |
| 2003/0046244 A1 | | 3/2003 | Shear et al. |
| 2004/0067746 A1 | | 4/2004 | Johnson |
| 2004/0176978 A1 | | 9/2004 | Simon et al. |
| 2005/0071264 A1 | | 3/2005 | Tsoa-Lee et al. |
| 2005/0131810 A1 | | 6/2005 | Garrett |
| 2005/0251474 A1 | | 11/2005 | Shinn et al. |
| 2006/0031180 A1 | | 2/2006 | Tamarkin |
| 2006/0108417 A1 | | 5/2006 | Simon et al. |
| 2006/0136314 A1 | | 6/2006 | Simon |
| 2006/0284734 A1 | | 12/2006 | Newman, Jr. |
| 2007/0060200 A1 | * | 3/2007 | Boris et al. ................... 455/558 |
| 2007/0061268 A1 | | 3/2007 | Herold |
| 2007/0100701 A1 | | 5/2007 | Boccon-Gibod et al. |
| 2007/0185728 A1 | | 8/2007 | Schwarz et al. |
| 2007/0185814 A1 | | 8/2007 | Boccon-Gibod et al. |
| 2007/0194881 A1 | | 8/2007 | Schwarz et al. |
| 2008/0053716 A1 | | 3/2008 | Scheucher |
| 2008/0109334 A1 | | 5/2008 | Lewis et al. |
| 2008/0172346 A1 | | 7/2008 | Kremen et al. |
| 2008/0184026 A1 | | 7/2008 | Hall et al. |
| 2008/0221743 A1 | | 9/2008 | Schwarz et al. |
| 2008/0319908 A1 | | 12/2008 | Venkatachalam |
| 2009/0013347 A1 | * | 1/2009 | Ahanger et al. ............. 725/36 |
| 2009/0024541 A1 | | 1/2009 | Kremen |
| 2009/0132805 A1 | | 5/2009 | Ginter |
| 2009/0183245 A1 | | 7/2009 | Simpson et al. |
| 2009/0222320 A1 | | 9/2009 | Arfin et al. |
| 2009/0234685 A1 | | 9/2009 | Tarbell et al. |
| 2009/0234750 A1 | | 9/2009 | Arfin |
| 2009/0284386 A1 | | 11/2009 | Nassimi |
| 2009/0287543 A1 | | 11/2009 | Allderdice et al. |
| 2009/0327031 A1 | | 12/2009 | Jain |
| 2010/0179708 A1 | | 7/2010 | Watson |
| 2010/0191575 A1 | | 7/2010 | Raleigh |
| 2010/0223180 A1 | | 9/2010 | Kremen |
| 2010/0244746 A1 | | 9/2010 | Van De Sluis et al. |
| 2010/0302578 A1 | | 12/2010 | Rego |
| 2011/0004570 A1 | | 1/2011 | Saad |
| 2011/0015797 A1 | | 1/2011 | Gilstrap |
| 2011/0086611 A1 | | 4/2011 | Klein et al. |
| 2011/0106883 A1 | | 5/2011 | Gupta et al. |
| 2011/0178926 A1 | | 7/2011 | Lindelsee et al. |
| 2012/0026726 A1 | * | 2/2012 | Recker ............. F21K 9/13 362/157 |
| 2012/0043889 A1 | * | 2/2012 | Recker ............. H05B 33/0815 315/86 |
| 2012/0232714 A1 | | 9/2012 | Ricket |
| 2014/0312802 A1 | | 10/2014 | Recker et al. |

FOREIGN PATENT DOCUMENTS

| | | |
|---|---|---|
| WO | 97/34448 A1 | 9/1997 |
| WO | 02/33669 A1 | 4/2002 |
| WO | 2004/049585 A1 | 6/2004 |

OTHER PUBLICATIONS

International Search Report and Written Opinion dated Aug. 4, 2012, in International Application No. PCT/IB2011/000998, filed May 10, 2011, 12 pages.

International Search Report and Written Opinion dated Mar. 27, 2013, in International Application No. PCT/US2012/066136, filed Nov. 20, 2012, 8 pages.

Peter Bladin, "Improving Microfinance through Telecommunications," Perspectives, Spring 2007, pp. 15-19.

* cited by examiner

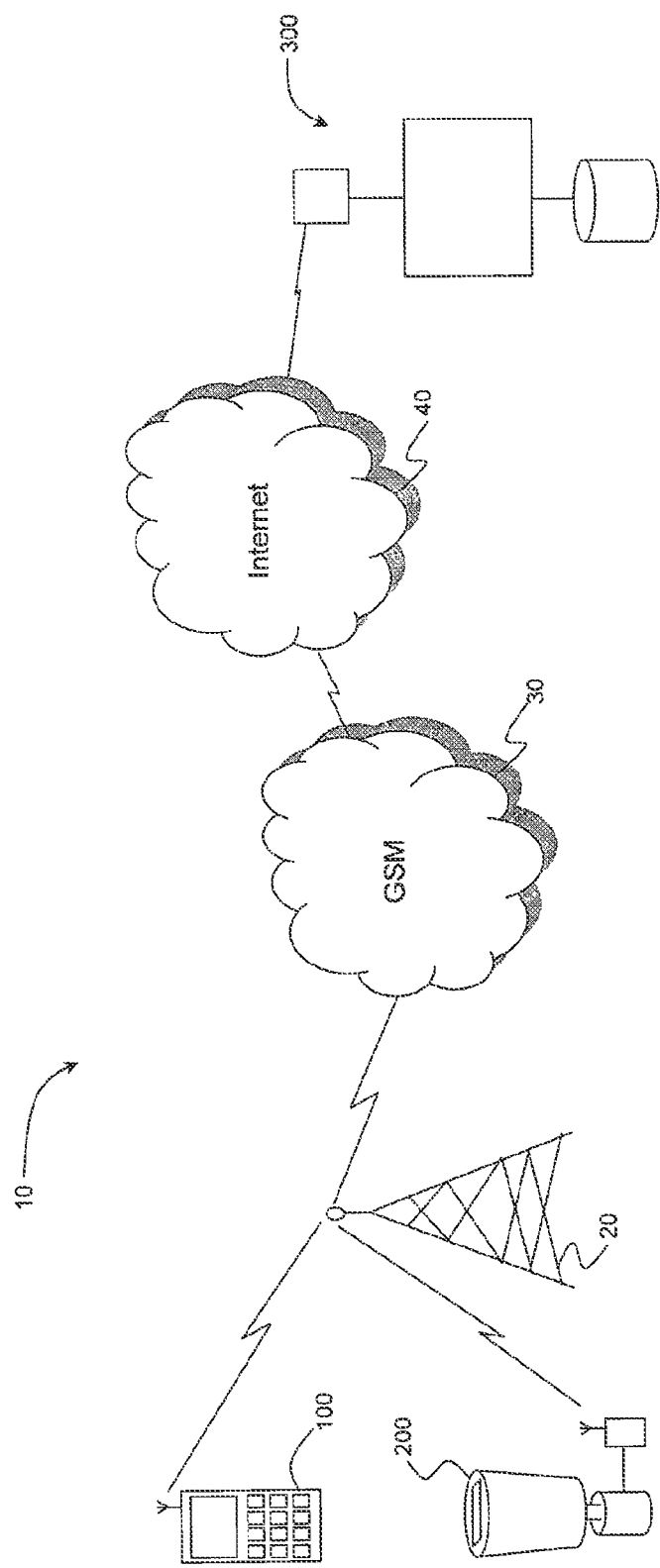

TRANSACTION PROCESSING AND REMOTE ACTIVATION

CROSS-REFERENCE TO RELATED APPLICATION

This application is a continuation of U.S. application Ser. No. 13/699,297, filed Nov. 20, 2012, priority of which is claimed under 35 U.S.C. §120, and the entirety of which is hereby incorporated by reference.

FIELD

Embodiments disclosed herein relate to processing of a transaction and activating a device in dependence on the processed transaction.

BACKGROUND

The vast majority of the human population earns very little money. With a low regular income, it is difficult for many people to amass sufficient capital to purchase assets. A number of schemes have been developed to address this problem. For example, one arrangement permits a person desiring to purchase an asset or a service to pay a portion of the price over time in a number of payments. When the price has been paid off, the person is provided with possession of the asset or the service is rendered.

As an alternative, a number of credit facilities have been developed which include micro-finance, hire purchase agreements, etc.

These known arrangements suffer from a disadvantage in that it may take significant time for the purchaser to pay off the purchase price. Financing arrangements suffer from the disadvantage of being costly to implement and administer, and can be difficult to enforce, particularly in a rural environment. Often, the purchaser will end up paying significantly more than the purchase price to cover the administration costs.

A further problem exists, particularly in developing economies, whereby once an asset has been purchased, insufficient planning is made to ensure for the maintenance of that asset. Therefore, assets that might otherwise be easily repaired are neglected to such an extent that repair becomes more expensive.

SUMMARY

The following description briefly summarizes certain aspects of the disclosure herein. This summary is not intended to identify or mention all features or implementations disclosed herein, nor is it intended to identify key features or otherwise be used to define the scope of the invention claimed hereafter. Aspects of the invention are set out in the accompanying claims.

A device (which may be considered an asset that is purchased or which provides a service that may be purchased) can be controlled through the use of a mobile communications device such as a cellular phone. The cellular phone is connected to a transaction processing system that communicates with the device to allow usage of the device only if the user has successfully paid for such use.

In accordance with at least one aspect, a device is communicatively connected to a remote transaction processing system. The device comprises a dedicated power supply that is independent of a mains power supply. The device has an operational state that is set according to an outcome of a transaction processed by the remote transaction processing system. The remote transaction processing system processes the transaction via communication with a separate mobile communications device.

The operational state of the device may be one of functional or non-functional. The device may be configured so that it operates only when the operational state is functional.

The transaction may involve an attempted payment and the operational state is set to be functional for a predetermined time in response to successful processing of the payment. The predetermined time may be determined by a timer included in the device or remote from the device. The device may further comprise an activation switch, wherein processing of the transaction by the remote transaction processing system is initiated by activation of the activation switch.

In various embodiments, the dedicated power supply comprises a solar collector and/or an electro-voltaic cell. The device may be communicatively connected to the remote transaction processing system via a wireless connection. The device may further comprise a usage monitor and a memory, wherein the usage monitor records usage information of the device in the memory. The usage information may be transmitted to a memory remote from the device. A timer may be configured to record a time and/or duration of use of the device.

The remote transaction processing system may be configured to process a payment for use of the device with credit that additionally is useable to pay for use of a mobile communications device.

In accordance with another aspect, a method of setting an operational state of a device may include processing a transaction in a remote transaction processing system and setting the operational state of the device according to an outcome of the processing of the transaction. The device has a dedicated power supply that is independent of a mains power supply and is communicatively connected to the remote transaction processing system. The transaction is processed in communication with a separate mobile communications device.

The operational state of the device may be one of functional or non-functional. The device may be configured to operate only when its operational state is functional, wherein the operational state is set to be functional for a predetermined time in response to successful processing of the transaction. The method may further comprise initiating the processing of the transaction by the transaction processing system in response to activation of an activation switch on the device.

In various embodiments, the dedicated power supply may comprise a solar collector and/or an electro-voltaic cell. The transaction may be initiated by interaction with the separate mobile communications device. The method may further comprise monitoring usage of the device and recording usage information in a memory. The usage information may be transmitted to a memory remote from the device. Monitoring usage of the device and recording usage information may comprise using a timer that records a time and/or duration of use of the device.

The remote transaction processing system processes payments, and the outcome of the processing of the transaction may comprise successfully processing a payment for use of the device. The method may further comprise allowing, by the remote transaction processing system, payment for use of the device with credit that additionally is useable to pay for use of a mobile communications device.

In accordance with yet another aspect, a system as described herein may comprise a device having a primary function other than facilitating communication, an interface for operating the device, and a transaction processing system that is remote from the device. The device, the interface, and the transaction processing system communicate wirelessly, wherein the transaction processing system is configured to process payment transactions for usage of the device, and wherein the outcome of the payment transactions determines whether the device is operational to provide its primary function.

The system may further comprise a usage monitor configured to collect usage information pertaining to use of the device. The device may be powered by a renewable energy source that is independent of a mains power supply, and the system may further comprise a processing module configured to calculate carbon offsets from the usage information. In some embodiments, the transaction processing system is primarily configured to process transactions relating to use of the interface as a cellular phone.

In accordance with still another aspect, a device may comprise equipment configured to provide a principal functionality other than two-way communication, a control unit configured to control the equipment, and communications circuitry configured for wireless communication. The communications circuitry is communicatively coupled to the control unit.

The device may be configured to operate in a plurality of operational states including a functional state and non-functional state. The control unit may be configured to communicate with a remote transaction processing system via the communications circuitry and, in response, receive from the remote transaction processing system an instruction that is based on a state of an account, and based on the received instruction, control whether the device is in the functional state or in the non-functional state.

When the device is in the functional state, the equipment may provide its principal functionality for a determined amount of use, after which the control unit is configured to transition the device to the non-functional state in which the equipment does not provide its principal functionality. The device may return to or remain in the functional state upon further communication with the remote transaction processing system and receipt of a further instruction based on the state of the account.

The device may further comprise an interface that is communicatively coupled to the control unit, wherein the control unit is configured to receive an input via the interface requesting that the equipment provide its principal functionality. In response to receiving the input, the control unit may communicate with the remote transaction processing system via the communications circuitry and receive, from the remote transaction processing system, the instruction that is based on the state of the account.

The interface may be configured to receive input from a user that is located in the vicinity of the device. In response to receipt of an instruction from the remote transaction processing system resulting from a capital amount that is owed for the device being paid off, the control unit may be configured to transition the device to a paid off state in which the device is usable without requiring further communication with the remote transaction processing system. If desired, the device may be powered by a renewable energy source. Moreover, the device may further comprise a usage monitor configured to collect usage information pertaining to use of the device, and a processing module configured to calculate carbon offsets based on the usage information.

BRIEF DESCRIPTION OF THE DRAWINGS

Example embodiments are hereinafter described with reference to the accompanying diagrams which are not to scale and where:

FIG. 1 illustrates a communication system according to an embodiment of the present disclosure;

DESCRIPTION OF EXAMPLE EMBODIMENTS

Figure 3:
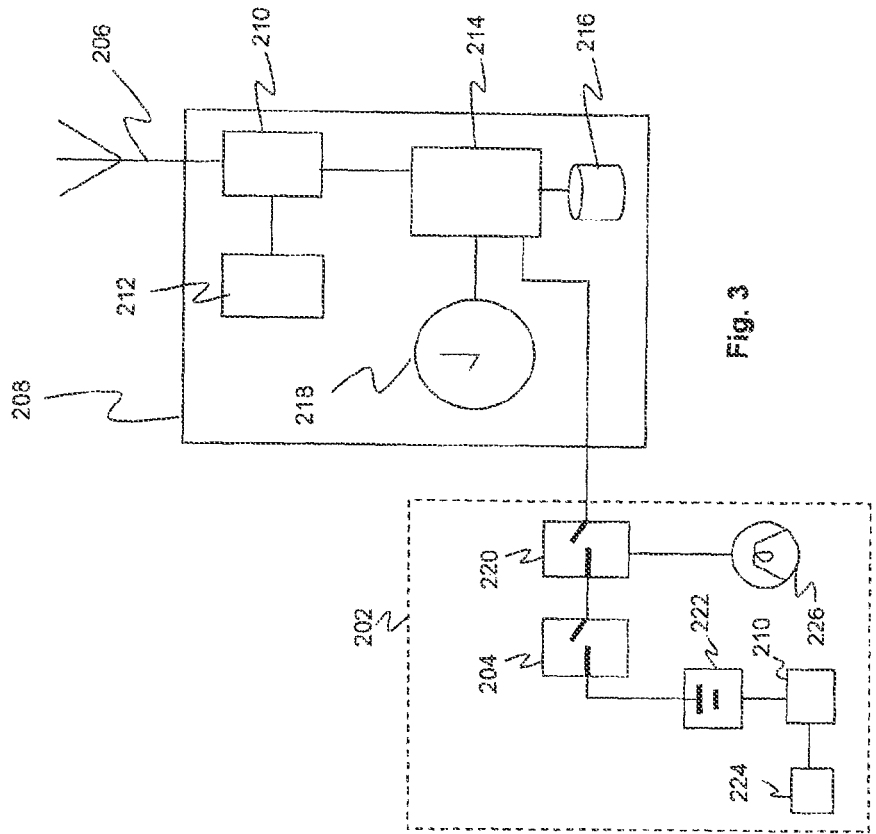
FIG. 3 illustrates a portion of the solar-powered lamp of FIG. 2.

The figures are schematic in nature and not drawn to scale, and are intended for illustrative purposes.

FIG. 1 illustrates a communication system 10 according to an embodiment of the present disclosure. The communication system 10 includes a user interface, in this embodiment a mobile communications device in the form of cellular phone 100, communicatively connected to a cellular phone mast 20. In the embodiment shown, the cellular phone mast 20 is further communicatively connected to a solar-powered lamp 200. The cellular phone mast 20 is part of a GSM communications network, generally denoted by reference 30 in FIG. 1. The GSM communications network 30 is further communicatively connected to the Internet 40. A transaction processing system 300 is communicatively connected to the cellular phone 100 and the solar-powered lamp 200 via the Internet 40 and the GSM communications network 30.

In the embodiment illustrated in FIG. 1, the cellular phone 100 and the solar-powered lamp 200 communicate with the same cellular phone mast, namely, cellular phone mast 20. Although it may often be the case that the device to which embodiments of the present disclosure are applied (in this case, the solar-powered lamp 200) and the user interface (in this case, the cellular phone 100) which is used to operate the device communicate via the same mast, embodiments of the present disclosure are not limited in this respect. In further embodiments, the user interface and the device communicate with distinct and separate masts or communicate via other communication hardware and protocols.

Referring back to FIG. 1, the solar-powered lamp 200 communicates with the GSM communications network 30, as indicated. The solar-powered lamp 200 is therefore provided with the necessary radio transmitters and receivers, as well as a Subscribers Identity Module (SIM) and other necessary hardware and software to allow them to communicate via the GSM network, as described in greater detail below. The solar-powered lamp 200 interacts with the GSM communications network 30 in a similar manner to the way known cellular phones, such as cellular phone 100, operate. In this embodiment, the cellular phone 100 and the solar-powered lamp 200 communicate with the GSM communications network 30 through the use of general packet radio service (GPRS). It should be understood however, that the manner in which this communication, or any other communication, occurs is not essential to the operation of embodiments of the present disclosure. In further embodiments, other wireless or wired communications protocols may be used.

Figure 2:
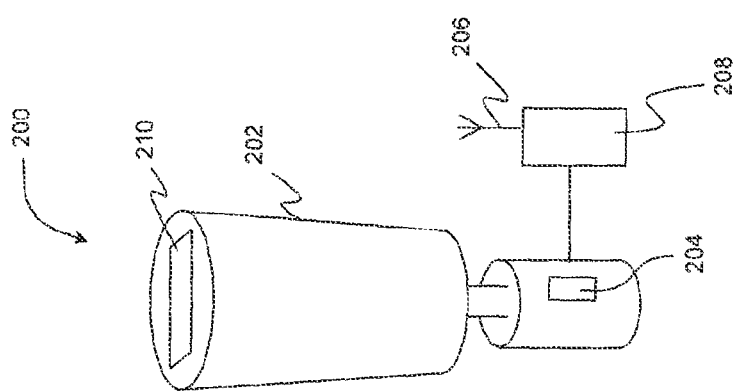
FIG. 2 illustrates a solar-powered lamp according to an embodiment of the present disclosure.

FIG. 2 illustrates the solar-powered lamp 200 in greater detail. The solar-powered lamp 200 includes a lamp portion 202 which has an activation switch 204. The lamp portion 202 is connected to a control unit 208. The lamp portion 202 further comprises a photovoltaic cell 210. The photovoltaic cell 210 operates to charge a battery (see below) during exposure to sunlight so that the lamp 200 may operate when there is little or no ambient light. A user uses the activation switch 204 to turn the solar-powered lamp 200 on and off. However, the lamp 200 will not activate (become functional) unless the control unit 208 allows this, in the manner described below.

The control unit 208 of the solar-powered lamp 200 is illustrated in greater detail in FIG. 3. As illustrated, the control unit 208 comprises an antenna 206. The antenna 206 is connected to a radio unit 210 which is, in turn, connected to a SIM 212. The antenna 206, radio unit 210 and SIM 212 operate together in a known manner so that the solar-powered lamp 200 (FIG. 2) may communicate over the GSM communications network 30 (as illustrated in FIG. 1). The radio unit 210 is further connected to a processor 214 having storage 216. The processor 214 is connected to a timer 218.

The control unit 208 is connected to the lamp portion 202 of the solar-powered lamp 200 (in this FIGURE, indicated by dashed outline). The processor 214 is connected to a switch 220 which is in turn connected to a bulb 226. The activation switch 204 is connected to the processor 214 and to a battery 222. The battery 222 powers the lamp portion 202 and provides electrical power to the bulb 226 as well as the radio unit 210, processor 214, and the other components of the solar-powered lamp 200 that require electrical power. The battery 222 is recharged by the photovoltaic cell 210. In embodiments of the present disclosure, the battery 222 is independent of the mains power supply and therefore the lamp 200 is portable and may be used in areas that have no mains electricity supply or when the mains electricity supply is intermittent or otherwise unavailable.

The lamp portion 202 further comprises an ammeter 224 which measures the current drawn from, and delivered to, the battery 222. The processor 214 is connected to the ammeter 224 and the readings made by the ammeter 224 are stored by the processor 214 in storage 216.

The bulb 226 of the lamp 200 will only operate if the user has activated switch 204 to place the switch 204 in the "on" position and the processor 214 has activated switch 220 to place the switch 220 also in the "on" position. In this way, the processor 214 determines whether or not the lamp is operational even after a user has turned on the switch 204.

Furthermore, the processor 214 controls the radio unit 210 and thereby controls the manner and content of the communications of the solar-powered lamp 200 over the GSM communications network 30 (as illustrated in FIG. 1). The processor 214 utilizes storage 216 during its operations in a known manner. In particular, the storage 216 stores an indication of the amount of time that the solar-powered lamp may operate in the form of a credit. In the manner disclosed below with reference to FIG. 5, the user transfers credit from the transaction processing system 300 to the lamp 200. The storage 216 keeps a record of the available credit and the processor reduces this record as the lamp 200 is used. The timer 218 is utilized by the processor 214 to keep track of the usage of the lamp 200 and for ancillary purposes such as for date and time stamping communications. This timing information, together with the current information gleaned from the ammeter 224, is stored in the storage 216 and transferred as usage information to the transaction processing system 300 in the manner described below.

Figure 4:
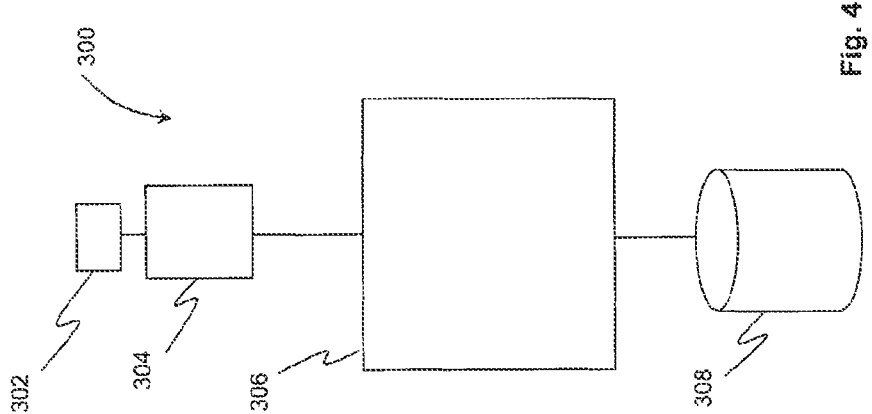
FIG. 4 illustrates a transaction processing system according to an embodiment of the present disclosure.

FIG. 4 illustrates a transaction processing system 300 according to an embodiment of the present disclosure. The transaction processing system 300 comprises an IP connection unit 304 having a socket 302. The transaction processing system 300 communicates with the Internet 40 in a manner known in the art by utilising the socket 302 and IP connection unit 304. In alternate embodiments, this connection is accomplished by communications protocols other than IP-related protocols, such as a GSM connection via a SIM card connected to the mobile network.

The transaction processing system 300 further comprises a processing unit 306 that controls the transaction processing system 300. The processing unit 306 is connected to storage 308 that is used to store data in the form of a database and associated data storage. It should be understood that the illustration of the transaction processing 300 in FIG. 4 is a schematic and many alternative ways of implementing such a system are known in the art.

In the embodiment illustrated, the transaction processing system 300 allows users to retain credit in personal accounts and transfer money into and out of such accounts, as well as between accounts within the transaction processing system, and accounts held elsewhere. As such, the transaction processing system is similar to known banking systems. The transaction processing system 300 furthermore allows users to operate their accounts (i.e., transfer amounts and purchase goods or services using money stored in their accounts) through the use of a cellular phone. Such transaction processing systems are known in the art; for example, the system operated in Kenya by GSM mobile operator Safaricom Limited, under the trade name "M-PESA."

In certain embodiments of the present disclosure, the transaction processing system may be arranged so that a user may optionally utilize funds stored on the transaction processing system to pay for use of the device. In an alternative embodiment, the transaction processing system is primarily used by the operator of the GSM communications network to allow a user to pay for the use of their cellular phone and in this embodiment, credit used primarily to pay for use of the cellular phone may, in addition, be used to pay for usage of the device in a manner analogous to that described below with reference to FIG. 5.

The transaction processing system 300, by communicating via the Internet 40 by way of the IP connection unit 304, is able to control certain operational aspects of the solar-powered lamp 200, which is also connected to the Internet 40 via GSM communications network 30. The manner in which this occurs is described in greater detail below with reference to FIG. 5.

Figure 5:
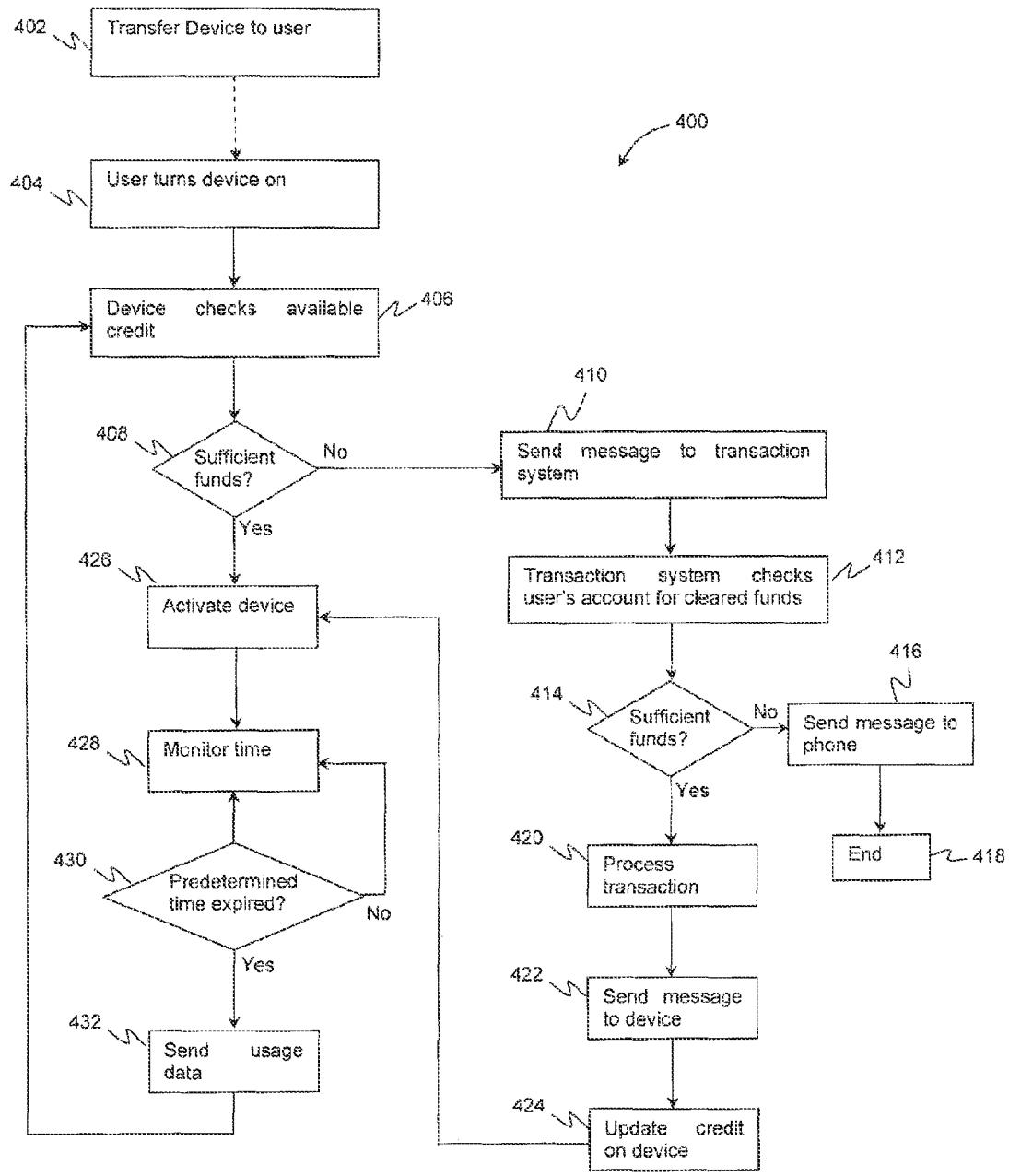
FIG. 5 illustrates a process of setting an operational state of the solar-powered lamp of FIG. 2 according to an embodiment of the present disclosure.

FIG. 5 illustrates a process 400 according to an embodiment of the present disclosure whereby the operational state of the solar-powered lamp 200 is controlled by the transaction processing system 300 on request by a user (not shown) interacting with the transaction processing system 300 by way of cellular phone 100.

At a preliminary step 402, possession of the device (which, in this case, is the solar-powered lamp 200) is transferred to the user. In the embodiment illustrated, the preliminary step involves a user paying a deposit to a supplier who, in return, will supply the user with the device. Typically, the deposit is less (in many instances significantly less) than the capital cost of the device.

During this preliminary step 402, the user's possession of the lamp 200 will be registered. The registration involves establishing a link between the device (in this embodiment, identified by an identification number) and the user. As the user uses their cellular phone 100 to operate the lamp 200, this registration process will involve establishing a link between the user's cellular telephone number and the identification number of the lamp 200.

In the following step, step 404, the user turns the solar-powered lamp 200 on by activating activation switch 204 (FIG. 2). Steps 402 and 404 are linked by a dashed line indicating that step 402 is a preliminary step in as much as step 402 will occur only once, whereas step 404 may occur many times during the lifespan of a device such as the solar-powered lamp 200.

At step 406, the processor 214 of the lamp 200 detects operation of switch 204 and checks the credit available for running the device by querying the record of that credit stored on the storage 216 (as illustrated in FIG. 3). The process will then proceed to step 408 where a determination is made whether the credit stored on the storage 216 is sufficient to operate the device.

If the available credit is not sufficient, the process will proceed to step 410 where the lamp will communicate with the transaction processing system 300 with a message in the manner discussed above. The message sent by the lamp 200 to the transaction processing system 300 will include an identification number by which the transaction processing system 300 will be able to identify the lamp 200 as well as a request to process a payment for use of the lamp 200 for a predetermined time. In this embodiment, the predetermined time is 8 hours.

At the following step, step 412, the transaction processing system 300 consults the account information held for the user who is determined, with reference to the identification number of lamp 200, to be the possessor of lamp 200. The transaction processing system 300 will thereby determine the amount of funds which the user has available to pay for use of the lamp 200.

At step 414, a determination is made whether the user has sufficient funds. If the user does not have sufficient funds, the process will move to step 416 where a message is sent to the user's cellular phone 100 informing them that they have insufficient funds, and reminding them to transfer additional funds. The process will then end at step 418. If the user subsequently transfers funds into his or her account, they will be able to restart the process by activating the switch 204, in which case the process will begin again at step 404.

If, on the other hand, at step 414 it is determined that the user has sufficient funds for the lamp to operate, the process will move on to step 420 where the transaction processing system 300 processes the payment for the device. This will involve debiting the user's account. Such transaction processing is known in the art and will not be further described herein. In a further embodiment referred to above, this step may involve debiting credit which would ordinarily be used by the user to pay for use of the cellular phone 100.

At the following step, step 422, the transaction processing system 300, by means of IP connection unit 304 and socket 302, will send a message to the lamp 200. This message will contain the identification number for the lamp together with an encrypted command to update the credit stored on the lamp 200.

At the following step, step 424, the lamp 200 receives the message sent by the transaction processing system 300. The processing unit 214 of lamp 200 will verify that the message was sent by the transaction processing system 300. In this embodiment, this is done by verifying an encryption key, but in further embodiments, this may occur in any one of known ways for verifying the sender of a message. Once the processing unit 214 of lamp 200 has verified that the message does, in fact, originate from processing system 300, it will perform the command specified in the message by updating the credit record stored on storage 316. In the embodiment illustrated, the only command issued by the transaction processing system 300 is to update the credit stored on the lamp 200. In a further embodiment however, the transaction processing system 300 issues other commands relating to the operational state of the device being controlled. For example, the transaction processing system 300 may communicate with the user by causing the lamp to flash on and off indicating that there is insufficient credit in their account. Alternatively, where the device is a device other than a lamp, the command issued by the transaction processing system may relate to the operation of the device. Once the credit on the lamp has been updated, the process will go on to step 426 where the lamp (the device, in this embodiment) is activated (i.e., turned on) through the activation of switch 220. Therefore, once switch 220 is activated, both switch 204 and switch 220 will have been activated, allowing the lamp to operate.

Referring back to step 408, if it is determined that there are sufficient funds stored on the device at this step, the process will proceed to step 426 where the lamp is activated.

Once the lamp has been turned on in step 426, the process will move to step 428 where the time which has elapsed since the lamp 200 was turned on is monitored. Therefore, the process will continuously proceed from step 428 to decision step 430 to compare the elapsed time against the predetermined time. If the elapsed time is less than the predetermined time, the process will return to step 428. However, if the elapsed time is equal to or greater than the predetermined time, the process will then proceed to step 432.

In this embodiment, the predetermined time is the time that has been stored in the storage 216 associated with processing unit 214 of the solar-powered lamp 200 (as described above with reference to FIG. 3). Each time the lamp 200 is activated, the lamp 200 is activated for the predetermined time unless the user turns the lamp off through again activating switch 204 during this time, in which case the process will begin again at step 404. In a further embodiment, the time for the activation may form part of the message sent by the transaction processing system 300 in step 416. Alternatively, the user may determine the predetermined time period and specify this as a parameter when communicating with the transaction processing systems 300 with the cellular phone 100.

Once it is determined at step 422 that the predetermined time has elapsed, the process will proceed to step 432 where usage information for the lamp 200 is sent to the transaction processing system 300. In this embodiment, the usage information will be sent to the transaction processing system 300 once every 8 hours as the predetermined time period of step 422 has been set to 8 hours. The process will then proceed back to step 406 where a determination is made of the available credit stored on storage 216. In this manner, the lamp will keep track of the continued use of the lamp and ensure that sufficient credit remains for this use. When the lamp then runs out of credit, the process will proceed to step 410 to obtain credit from the transaction processing system 300 in the manner described. At any point during the process defined by steps 406, 408, 426, 428, 430, and 432, the user may operate switch 204, which pauses the process. When the user reactivates switch 204, the process will continue from the same point where it was paused.

In a further embodiment, not illustrated in the accompanying figures, the operational state of the lamp 200 is changed from on to off by having the transaction processing system send a further command to the lamp 200 by message. In this embodiment, the transaction processing system 300 keeps track of the predetermined time period and, once this time period has elapsed, will send the message to turn the lamp 200 off.

Advantageously, with embodiments of the present disclosure, the user is given possession of an asset, such as the solar-powered lamp 200, on payment of a deposit which is less than the cost of the device. The user will then pay for the use of the device for a predetermined time period and a portion of this cost will be attributed to the capital cost of the device. It will be realized that as the user continues to use the device, more and more of the capital cost will be repaid until all of the capital cost has been paid back. At this time, the ownership in the asset may be transferred to the user.

Figure 6:
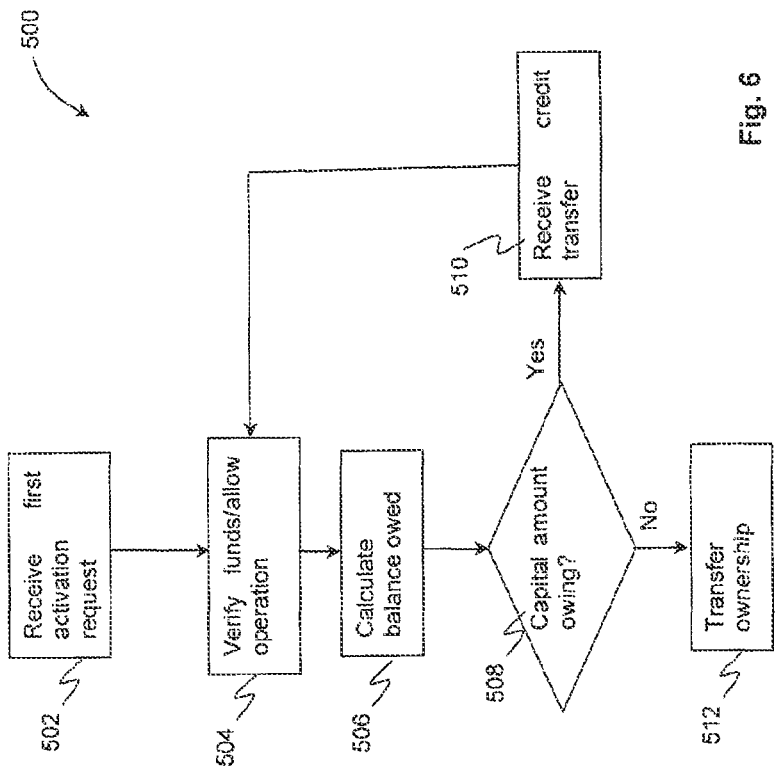
FIG. 6 illustrates a further process according to an embodiment of the present disclosure.

FIG. 6 illustrates a process 500 whereby the transaction processing system 300 determines whether a user has paid off the capital cost of the device (in this embodiment, the solar-powered lamp 200). At the initial step 502 of process 500, the transaction processing system 300 receives a request from the user to activate the lamp 200 in the manner described above with reference to the process of FIG. 5.

When this initial request is received, the process will continue on to step 504 wherein a determination is made of the funds which the user has available and, if those funds are sufficient, the operational state of the lamp 200 will be changed from off to on (also in the manner described above).

In the following step, step 506, the capital amount owing in respect of the lamp 200 by the user will be calculated. If in the previous step, step 504, it was determined that the user has sufficient funds to allow the use of the lamp 200, the capital amount owing will be reduced in step 506 by the portion of the amount charged to the user for the use of the lamp 200 which has been apportioned to paying back the capital amount.

At the next step, step 508, a determination is made of the capital amount still owing by the user. If the amount still owing has reduced to zero, the process will continue to step 512 where ownership in the lamp 200 will be transferred to the user. In this embodiment, transfer of ownership will involve allowing the user to use the lamp 200 without charging therefor. In order to facilitate this, the transaction processing system 300 will send a message to the lamp 200 which will thereafter allow use of the lamp 200 without requiring payment.

In an alternative embodiment, ownership of the lamp 200 will entitle the user to a reduced cost for the use of the lamp 200. In this embodiment, the usage costs may be processed as payments in respect of an insurance or maintenance policy covering repair of the lamp 200. The user will then be entitled to have the lamp 200 repaired, or be provided with a new lamp, should the lamp stop functioning.

Referring back to FIG. 6, if at step 508 it is determined that a portion of the capital amount is still outstanding, the process will proceed to step 510. At step 510, the transaction processing system will await the next credit transfer from the user. When the credit transfer is received, the transaction processing system 300 will return to step 504 and verify that the user has sufficient funds to allow usage of the lamp 200.

The usage information collected by the lamp and transferred to the transaction processing system 300 in step 432 of FIG. 5 may be used to keep track of how a user uses the lamp 200 or any other device in which embodiments of the present disclosure have been implemented. Furthermore, this data may be used, in particular when the device relies on "renewable energy" such as solar or wind power, to calculate carbon offsets and apply them for that user or for an organisation affiliated with that user.

In this manner, the transaction processing system 300 will continuously monitor and charge for usage of the lamp 200 until such time as the user has paid back the cost of the lamp.

In the embodiment illustrated and described above, the transaction processing system 300 interacts with the solar-powered lamp 200 to allow activation of the solar-powered lamp 200. In further embodiments, the control unit of the solar-powered lamp operates to collect information regarding the usage and state of the solar-powered lamp and communicate this information to the transaction processing system or to a further remote location where this information is stored and collated. In such embodiments, the solar-powered lamp will include the necessary sensors and storage medium to allow collection of the data.

In the embodiments illustrated and described above, the remotely-operated device is a solar-powered lamp. However, embodiments of the invention are not limited in this respect. Other devices may be substituted for the solar-powered lamp. For example, more substantial equipment such as an electrical generator, an automobile, a radio, etc., may be used.

The invention claimed is:

1. A device having a functionality, the device comprising:
a control unit having a processor;
circuitry providing the functionality of the device;
a power supply that is independent of a mains power supply;
an internal switch coupled between the power supply and the circuitry providing the functionality of the device, wherein the internal switch is controlled by the processor of the control unit;
an external switch that is controlled by a user of the device; and
a wireless communications interface communicatively coupled to the control unit,
wherein the processor is configured to receive a message from a remote transaction processing system via the wireless communications interface, the message conveying information representing an outcome of a transaction processed by the remote transaction processing system via communication with a mobile communications apparatus separate from the device,
wherein the device has multiple operational states including a functional operational state and a non-functional operational state, and the control unit is configured to set the operational state of the device based on the information conveyed by the message received from the remote transaction processing system,
wherein when the control unit sets the device in the functional operational state, the processor activates the internal switch such that the power supply supplies power to the circuitry providing the functionality and the device provides the functionality in response to user activation of the external switch, and when the control unit sets the device in the non-functional operational state, the processor deactivates the internal switch such that the power supply is not able to supply power to the circuitry for providing the functionality and the device is unable to provide the functionality regardless of user activation of the external switch.

2. The device according to claim 1, wherein the device is configured to provide the functionality only when the operational state of the device is functional.

3. The device according to claim 1, wherein the transaction involves a payment and the device is set in the functional operational state for a predetermined time in response to receiving a message conveying information indicating successful processing of the payment, and wherein the predetermined time is tracked by a timer that is included in the device or is remote from the device.

4. The device according to claim 1, wherein processing of the transaction by the remote transaction processing system is initiated by user activation of the external switch.

5. The device according to claim 1, wherein the power supply comprises a solar collector.

6. The device according to claim 1, wherein the device is communicatively connected to the remote transaction processing system via the wireless communications interface.

7. The device according to claim 1, further comprising a usage monitor and a memory, wherein the usage monitor records usage information in the memory regarding usage of the device.

8. The device according to claim 1, wherein the device is further configured to transmit usage information regarding usage of the device to a memory remote from the device.

9. The device according to claim 1, further comprising a timer configured to record a time of day of use or a duration of use of the device.

10. The device according to claim 1, wherein the information conveyed by the received message represents successful payment for use of the device using credit that is otherwise used to pay for use of the separate mobile communication apparatus.

11. A method of configuring a device having a functionality, the method comprising:
receiving, by a wireless communications interface of the device, an electronic message conveying information representing an outcome of a transaction that was processed by a remote transaction processing system in communication with a mobile communications apparatus separate from the device; and
setting an operational state of the device based on the information conveyed by the received message, wherein the device has multiple operational states including a functional operational state and a non-functional operational state,
wherein setting the device in the functional operational state includes activating an internal switch in the device that enables a power supply of the device to supply power to circuitry in the device that provides the functionality and the device is able to provide the functionality in response to user activation of the device, and setting the device in the non-functional operational state includes deactivating the internal switch such that the power supply is not able to supply power to the circuitry that provides the functionality and the device is unable to provide the functionality regardless of user activation of the device,
wherein the power supply of the device is independent of a mains power supply and provides power for the functionality of the device.

12. The method according to claim 11, wherein the device provides the functionality only when the operational state is functional, the method further comprising setting the device to be in the functional operational state for a predetermined time in response to receiving information representing a successful processing of the transaction.

13. The method according to claim 11, further comprising initiating the processing of the transaction by the remote transaction processing system in response to user activation of an activation switch on the device.

14. The method according to claim 11, wherein the power supply provides power from a solar collector.

15. The method according to claim 11, wherein the transaction is initiated by interaction of the remote transaction processing system with the separate mobile communications apparatus.

16. The method according to claim 11, further comprising monitoring usage of the device and recording usage information in a memory.

17. The method according to claim 16, further comprising transmitting the usage information to a memory remote from the device.

18. The method according to claim 16, wherein monitoring usage of the device and recording usage information comprises using a timer that records a time of day of use or a duration of use of the device.

19. The method according to claim 11, wherein the information conveyed by the received message represents successful processing of a payment by the separate mobile communications apparatus for use of the device.

20. The method according to claim 19, wherein the payment for use of the device is achieved using a credit that is otherwise useable to pay for use of the separate mobile communications apparatus.

21. A system, comprising:
a device having a functionality, the device including an internal switch that couples a power supply to circuitry in the device that provides the functionality, wherein the device has multiple operational states including a functional operational state and a non-functional operational state such that when the device is set in the functional operational state, the internal switch is activated which enables the power supply to supply power to the circuitry that provides the functionality and the device is able to provide the functionality in response to user activation of the device, and when the device is set in the non-functional operational state, the internal switch is deactivated such that the power supply is not able to supply power to the circuitry that provides the functionality and the device is unable to provide the functionality regardless of user activation of the device;
an interface for operating the device; and
a transaction processing system that is remote from the device,
wherein the device and the transaction processing system communicate wirelessly, wherein the transaction processing system is configured to process payment transactions for use of the device, and wherein the outcome of the payment transactions determines whether the device is set in the non-functional operational state or the functional operational state, the device being set in the functional operational state in response to receipt of a wireless message by the device from the transaction processing system resulting from successful processing of a payment transaction for use of the functionality of the device.

22. The system according to claim 21, further comprising a usage monitor configured to collect usage information pertaining to use of the functionality of the device, wherein the device is powered by a renewable energy source that is independent of a mains power supply, and wherein the system further comprises a processing module configured to calculate a carbon offset from the usage information.

23. The system according to claim 21, wherein the transaction processing system is further configured to process transactions relating to use of the interface as a cellular phone.

24. A device, comprising:
equipment in the device configured to provide a functionality other than two-way communication;
a control unit in the device configured to control use of the equipment; and
communications circuitry in the device configured for wireless communication, wherein the communications circuitry is communicatively coupled to the control unit;
wherein the device is configured to operate in a plurality of operational states including a functional operational state and a non-functional operational state;
wherein the control unit is configured to:
communicate with a transaction processing system that is remote from the device via the communications circuitry and, in response, receive from the remote transaction processing system an instruction that is based on a state of an account, and
based on the received instruction, control whether the device is operating in the functional operational state or in the non-functional operational state;
wherein, when the device is operating in the functional operational state, the control unit activates an internal switch in the device that couples a power supply to the equipment which provides power to the equipment and enables the equipment to respond to user activation of the device and provide the functionality for a determined amount of use, and after the functionality of the device has been used for the determined amount of use, the control unit transitions the device to operate in the non-functional operational state in which the internal switch is deactivated which decouples the power supply from the equipment and the equipment does not provide the functionality regardless of user activation of the device; and
wherein, when the device is operating in the non-functional operational state, the control unit transitions the device to operate in the functional operational state in response to communication with the remote transaction processing system and receipt of a further instruction based on the state of the account.

25. The device according to claim 24, further comprising an interface communicatively coupled to the control unit, wherein the control unit is configured to:
receive an input via the interface requesting that the equipment provide the functionality; and
in response to receiving the input, communicate with the remote transaction processing system via the communications circuitry and receive, from the remote transaction processing system, the instruction that is based on the state of the account.

26. The device according to claim 25, wherein the interface is configured to receive the input from a user that is operating the device.

27. The device according to claim 24, wherein, in response to receipt of an instruction from the remote transaction processing system resulting from a capital amount owed for the device being paid off, the control unit is configured to transition the device to a paid off operational state in which the equipment is usable to provide the functionality without requiring further communication with the remote transaction processing system.

28. The device according to claim 24, wherein the device is powered by a renewable energy source, the device further comprising:
a usage monitor configured to collect usage information pertaining to use of the functionality of the device; and
a processing module configured to calculate a carbon offset based on the usage information.

29. The device according to claim 1, wherein the power supply comprises an electro-voltaic cell.

30. The method according to claim 11, wherein the power supply provides power from an electro-voltaic cell.

* * * * *